US012015655B2

United States Patent
Arngren et al.

(10) Patent No.: US 12,015,655 B2
(45) Date of Patent: Jun. 18, 2024

(54) METHOD AND SYSTEM FOR HANDLING A TELECONFERENCE

(71) Applicant: Telefonaktiebolaget LM Ericsson (publ), Stockholm (SE)

(72) Inventors: Tommy Arngren, Södra Sunderbyn (SE); Tommy Falk, Spånga (SE); Andreas Kristensson, Södra Sandby (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/039,026

(22) PCT Filed: Jan. 18, 2021

(86) PCT No.: PCT/EP2021/050945
§ 371 (c)(1),
(2) Date: May 26, 2023

(87) PCT Pub. No.: WO2022/152403
PCT Pub. Date: Jul. 21, 2022

(65) Prior Publication Data
US 2023/0421620 A1    Dec. 28, 2023

(51) Int. Cl.
*H04L 65/403* (2022.01)
*G10L 15/02* (2006.01)
(Continued)

(52) U.S. Cl.
CPC ............ *H04L 65/403* (2013.01); *G10L 15/02* (2013.01); *G10L 15/22* (2013.01); *G10L 21/034* (2013.01); *G10L 21/0364* (2013.01)

(58) Field of Classification Search
CPC ...... H04L 65/403; G10L 15/02; G10L 21/034; G10L 21/0364
(Continued)

(56) References Cited

U.S. PATENT DOCUMENTS 6,810,116 B1 * 10/2004 Sorensen ............... H04M 3/56
379/202.01
8,589,487 B1 * 11/2013 Reeves ............... H04L 65/1069
709/204

(Continued)

OTHER PUBLICATIONS

International Search Report and Written Opinion of the International Searching Authority, PCT/EP2021/050945, mailed Oct. 12, 2021, 16 pages.

*Primary Examiner* — Tauqir Hussain
(74) *Attorney, Agent, or Firm* — Sage Patent Group

(57) ABSTRACT

A method performed by a system of a communication network includes obtaining digital representations of speech detected from communication devices connected to a teleconference, and receiving a request for a parallel discussion from a first of the communication devices with a subgroup of the communication devices. Further, the system sets up a parallel discussion group for the first communication device and the subgroup of communication devices, provides the digital representations of speech of the first communication device and the subgroup of communication devices only to the devices of the parallel discussion group so that each device of the parallel discussion group is able to play back the digital representations of speech of the other devices of the parallel discussion group, and provides the digital representations of speech of the plurality of communication devices except the first communication device and the subgroup of communication devices.

17 Claims, 6 Drawing Sheets

(51) Int. Cl.
*G10L 15/22* (2006.01)
*G10L 21/034* (2013.01)
*G10L 21/0364* (2013.01)

(58) Field of Classification Search
USPC .......................................................... 709/204
See application file for complete search history.

(56) References Cited

U.S. PATENT DOCUMENTS

| | | | |
|---|---|---|---|
| 2007/0076660 A1* | 4/2007 | Sung | H04L 65/4038 |
| | | | 370/352 |
| 2007/0121526 A1* | 5/2007 | Sung | H04W 4/10 |
| | | | 370/252 |
| 2009/0282000 A1* | 11/2009 | Bennett | G06F 16/9535 |
| 2009/0291704 A1* | 11/2009 | Korus | H04L 12/1818 |
| | | | 455/519 |
| 2010/0241700 A1* | 9/2010 | Rasmussen | H04L 12/1822 |
| | | | 709/203 |
| 2011/0243553 A1* | 10/2011 | Russell | H04L 12/6418 |
| | | | 398/115 |
| 2020/0228358 A1* | 7/2020 | Rampton | G06N 3/006 |
| 2021/0203727 A1* | 7/2021 | Pounds | H04L 67/01 |

* cited by examiner

METHOD AND SYSTEM FOR HANDLING A TELECONFERENCE

CROSS REFERENCE TO RELATED APPLICATIONS

This application is a 35 U.S.C. § 371 national stage application of PCT International Application No. PCT/EP2021/050945 filed on Jan. 18, 2021, the disclosure and content of which is incorporated by reference herein in its entirety.

TECHNICAL FIELD

The present disclosure relates generally to methods and systems for handling a teleconference. More specifically, it relates to methods and systems for handling digitally represented speech from users involved in a teleconference. The present disclosure further relates to computer programs and carriers corresponding to the above methods and systems.

BACKGROUND

Many meetings today are held remotely via teleconference solutions. "Teleconference" in this disclosure also comprises video conference and extended reality, XR, meetings. There are several different video conferencing solutions existing today, such as Microsoft® Teams™, Skype®, Zoom® etc. They all offer ways to have virtual meetings that are fully distributed or connecting groups of participants in conference rooms equipped with cameras, screens and microphones, or combinations thereof.

In a physical meeting, it is possible for two or more participants sitting close to each other to have a private discussion, i.e., a discussion that other participants cannot hear, by whispering etc. However, in a teleconference, given today's available teleconference solutions, you need to set up a separate communication channel using another communication device, another service or at least a parallel chat in order to have such a private discussion with another person of the teleconference.

It is possible to move between parallel teleconference meetings or discussions or sub-meetings in e.g., Microsoft® Teams™, however, one meeting will be put on hold as a user moves to the other meeting, which is then activated. In other words, it is not possible to follow both meetings. Consequently, there is a need for a teleconference solution where a private discussion can be held within an ongoing teleconference, still giving the possibility to follow both meetings.

SUMMARY

It is an object of the present disclosure to address at least some of the problems and issues outlined above. It is possible to achieve these objects and others by using methods and systems as defined in the attached independent claims.

According to one aspect, a method is provided that is performed by a system of a communication network for handling a teleconference. The method comprises obtaining digital representations of speech detected from sound captured at a microphone of each of a plurality of communication devices connected to the teleconference, and receiving, after the obtaining, a request for a parallel discussion from a first of the plurality of communication devices connected to the teleconference, the request for a parallel discussion being with a subgroup of the plurality of communication devices connected to the teleconference. The method further comprises setting up a parallel discussion group for the first communication device and the subgroup of communication devices, based on the received request, which parallel discussion group is at least partly separated from the teleconference. The method further comprises providing the digital representations of speech of the first communication device and the subgroup of communication devices only to the devices of the parallel discussion group so that each device of the parallel discussion group is able to play back the digital representations of speech of the other devices of the parallel discussion group, and providing the digital representations of speech of the plurality of communication devices except the first communication device and the subgroup of communication devices, called remaining teleconference communication devices to the plurality of communication devices so that each device of the plurality of communication devices is able to play back the digital representations of speech of the other devices of the remaining teleconference communication devices According to another aspect, a system is provided, which is operable in a wireless communication system and configured for handling a teleconference. The system comprises a processing circuitry and a memory. Said memory contains instructions executable by said processing circuitry, whereby the system is operative for obtaining digital representations of speech detected from sound captured at a microphone of each of a plurality of communication devices connected to the teleconference, and receiving, after the obtaining, a request for a parallel discussion from a first of the plurality of communication devices connected to the teleconference, the request for a parallel discussion being with a subgroup of the plurality of communication devices connected to the teleconference. The system is further operative for, based on the received request, setting up a parallel discussion group for the first communication device and the subgroup of communication devices, which parallel discussion group is at least partly separated from the teleconference, providing the digital representations of speech of the first communication device and the subgroup of communication devices only to the devices of the parallel discussion group so that each device of the parallel discussion group is able to play back the digital representations of speech of the other devices of the parallel discussion group, and providing the digital representations of speech of the plurality of communication devices except the first communication device and the subgroup of communication devices, called remaining teleconference communication devices, to the plurality of communication devices so that each device of the plurality of communication devices is able to play back the digital representations of speech of the other devices of the remaining teleconference communication devices.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
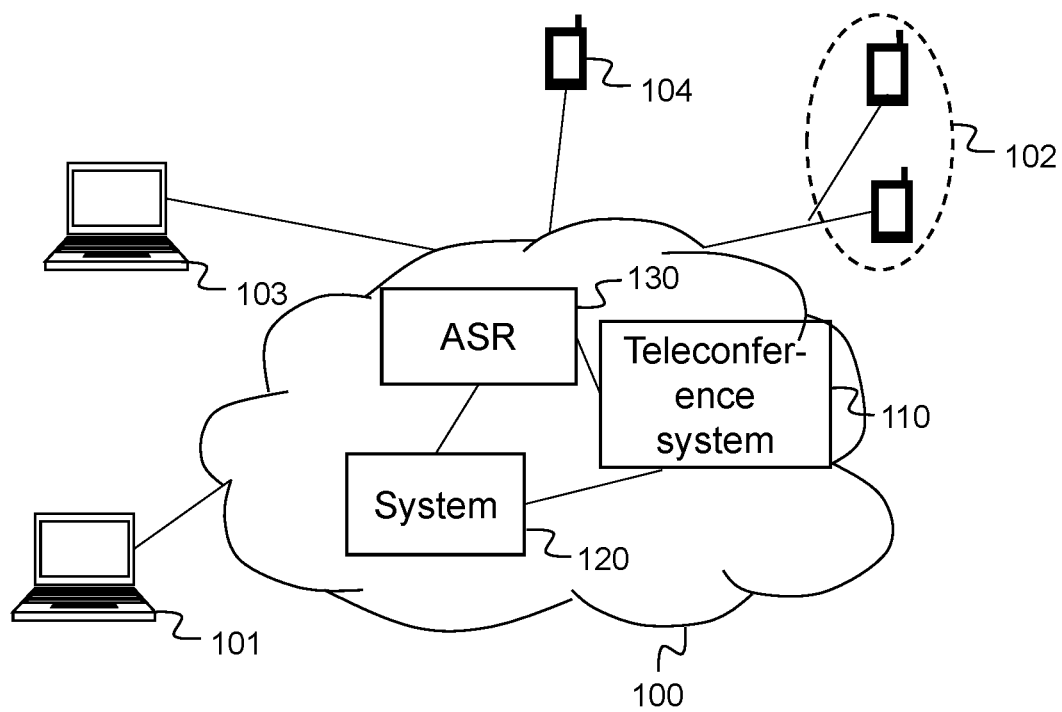
FIG. 1 is a schematic block diagram of a communication system in which embodiments of the present disclosure may be used.

FIG. 1 shows a communication network 100 in which embodiments of the present disclosure can be used. The communication network 100 comprises a teleconference system 110 and a system 120 for handling the teleconference provided by the teleconference system 110. The system 120 may be part of the teleconference system 110 or the system 120 may be separate from the teleconference system 110. As shown in FIG. 1, there are a plurality of communication devices 101, 102, 103, 104 with the ability to connect to the communication network 100 and to connect to the teleconference system 110. The communication network 100 may also comprise an automatic speech recognition (ASR) system 130 arranged for obtaining digital representations of speech detected from sound captured at a microphone of individual of the plurality of communication devices 101, 102, 103, 104. Alternatively, the system 120 may be arranged for obtaining digital representations of speech detected from sound captured at a microphone of individual of the plurality of communication devices 101, 102, 103, 104.

The communication network 100 may be any kind of wireline or wireless communication network that can provide access to communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR). Examples of wireline communication networks are telephone networks, cable television networks, internet access networks, and fiber-optic communication networks.

The communication devices 101, 102, 103, 104 may be any type of wireline or wireless communication device capable of communicating with the communication network 100 and to connect to the teleconference system 110. Examples of wireless and wireline communication devices are a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE), local teleconference equipment etc.

Figure 2:
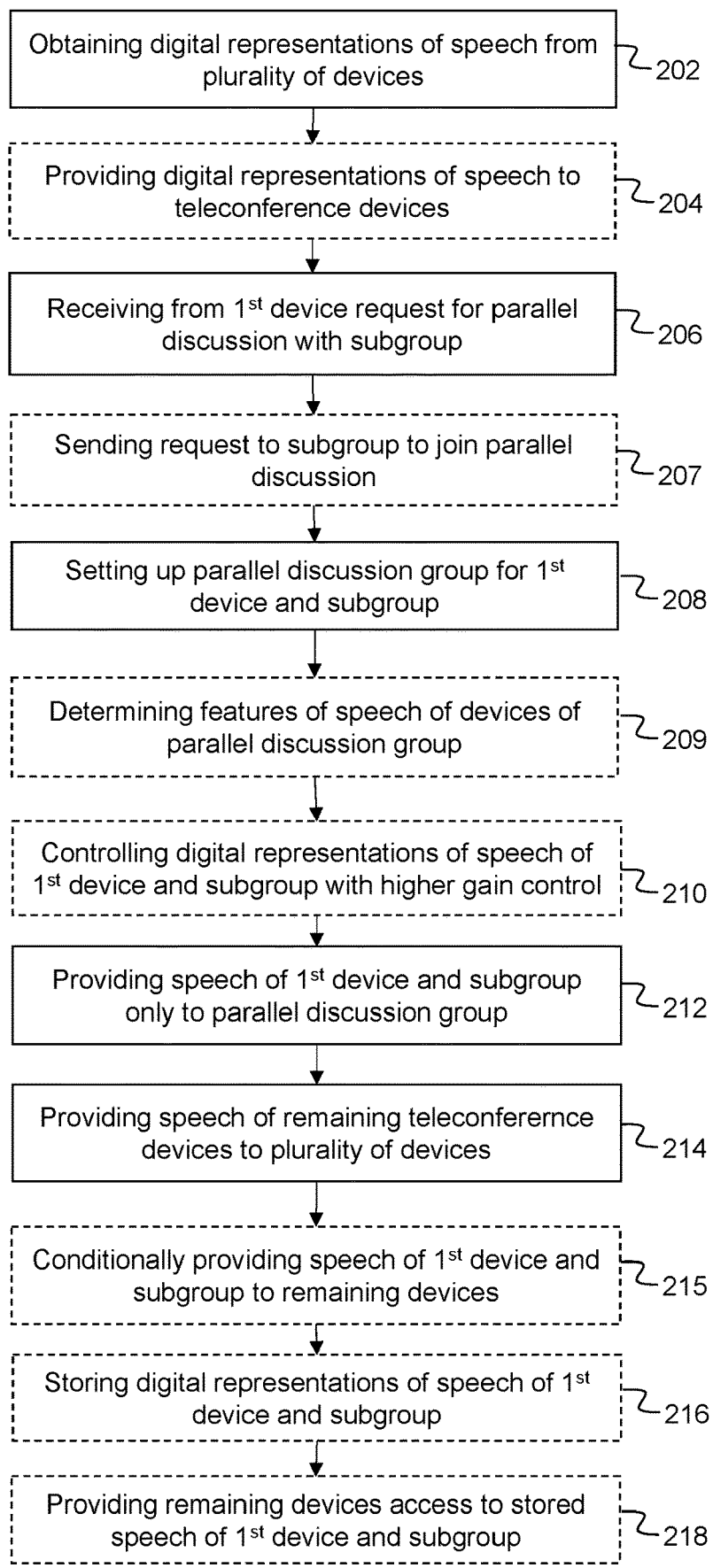
FIG. 2 is a flow chart illustrating a procedure performed by a system, according to possible embodiments.

FIG. 2, in conjunction with FIG. 1, describes a method performed by a system 120 of a communication network 100 for handling a teleconference. The method comprises obtaining 202 digital representations of speech detected from sound captured at a microphone of each of a plurality of communication devices 101, 102, 103, 104 connected to the teleconference, and receiving 206, after the obtaining 202, a request for a parallel discussion from a first 101 of the plurality of communication devices connected to the teleconference, the request for a parallel discussion being with a subgroup 102 of the plurality of communication devices connected to the teleconference. The method further comprises setting up 208 a parallel discussion group for the first communication device 101 and the subgroup 102 of communication devices, based on the received request, which parallel discussion group is at least partly separated from the teleconference. The method further comprises providing 212 the digital representations of speech of the first communication device 101 and the subgroup 102 of communication devices only to the devices 101, 102 of the parallel discussion group so that each device of the parallel discussion group is able to play back the digital representations of speech of the other devices of the parallel discussion group, and providing 214 the digital representations of speech of the plurality of communication devices except the first communication device and the subgroup of communication devices, called remaining teleconference communication devices 103, 104, to the plurality of communication devices 101, 102, 103, 104 so that each device of the plurality of communication devices is able to play back the digital representations of speech of the other devices of the remaining teleconference communication devices.

Hereby, means is provided for participants in a teleconference to arrange a private, parallel discussion within the ongoing teleconference, in which audio associated with said private discussion is muted for the remaining participants of the teleconference, i.e. the ones not involved in the private discussion. At the same time, the participants of the private discussion can still hear the audio from the teleconference, i.e. the open meeting so they can follow what happens there. With such a solution, it is possible to engage in parallel discussions without having to move in/out between parallel meetings.

The system 120 may be a part of the teleconference system 110 of FIG. 1 or a separate system (as shown in the example of FIG. 1). Alternatively, the system 120 may be spread out over different physical or virtual nodes in the communication network 100, a so-called cloud solution. A digital representation of speech may also be called an audio stream, i.e., a waveform of speech. The system 120 receives the digital representations of speech from the plurality of communication devices directly and/or via the ASR 130 of FIG. 1. The parallel or private discussion is a meeting occurring simultaneously as the teleconference, for a subgroup of the users involved in the teleconference. The request message for a parallel discussion received 206 from the first device may comprise already agreed participants of the parallel discussion group, i.e. participants where the first device has already received an accept to join the parallel discussion. In this case, the device or devices of the subgroup have already accepted a separate invitation from the first device. Alternatively, the request is a request by the first device to the system, based on which the system asks the devices of the subgroup whether individual of them wants to join, before setting up the parallel discussion group. The subgroup 102 of communication devices may comprise one or more communication devices. In FIG. 1, the subgroup 102 is illustrated, purely as an example, by two mobile phones. The steps 212, 214 deals with providing the digital representations of speech during the teleconference/parallel discussion, i.e. more or less in real-time. The term "the other devices" in steps 212, 214 signifies other devices apart from the device itself. In other words, in step 212 normally each device in the parallel discussion group 101, 102 is provided with a digital representation of speech from all other communication devices of the parallel discussion group but not its own speech. Also, in step 214, normally each device of the teleconference 101, 102, 103, 104 is provided with a digital representation of speech from all remaining teleconference communication devices 103, 104 except its own speech, in case the device in question is one of the remaining teleconference devices. The word "playback" in steps 212, 214 signifies to render the audio stream originating from some other client in real-time at the communication device in question. Further, the digital representations of speech may be provided by the system 120 to the devices by being relayed as separate signals, or the system may mix the digital representations of speech and the mixed signal is sent to the devices. The mix may also be individually adapted to the requests of the users of the individual receiving devices. In other words, the mix of the digital representations of speech may be different for different users.

According to an embodiment, the method further comprises, before and when receiving 206 the request for a parallel discussion, providing 204 the digital representations of speech of the plurality of communication devices 101, 102, 103, 104 to the plurality of communication devices so that each device of the plurality of communication devices is able to play back the digital representations of speech of the other devices of the plurality of communication devices. Hereby it is clear that the request 206 for and the set-up 208 of the parallel discussion group is done during an ongoing teleconference in which the first device 101 and the subgroup 102 of devices are already involved.

According to another embodiment, the method further comprises controlling 210 the digital representations of speech of the first communication device 101 and the subgroup 102 of communication devices with a higher gain control value than the digital representations of speech of the remaining teleconference communication devices 103, 104. Further, the digital representations of speech provided 212, 214 to the first communication device 101 and the subgroup 102 of communication devices are the controlled 210 digital representations of speech. As the digital representations of speech of the first device and the subgroup are controlled with a higher gain control value than the digital representations of the remaining devices, when provided to the first device and the subgroup, the devices involved in the parallel discussion will automatically hear the voices of the devices of the parallel discussion with a higher volume than the voices of the remaining devices of the teleconference. This means the devices of the parallel discussion can still hear what is said in the teleconference at the same time as those voices will not interfere too much with the voices of the participants of the parallel discussion. The gain control value(s) for the first device and the subgroup as well as the gain control value(s) for the remaining devices may be defined by any of the devices in the parallel discussion group during the parallel discussion, such as the first device, or may be pre-defined at setup. That the digital representations of speech of the first device and the subgroup are controlled with a higher gain control value than the digital representations of the remaining devices may be realized in different ways. One realization is to suppress the volume of the digital representation of speech of the remaining devices and let the volume of the digital representations of speech of the first device and the subgroup be untouched. Another realization is to increase the volume of the first device and the subgroup and let the volume of the remaining devices be untouched.

According to another embodiment, the method further comprises, in response to the receiving 206 of a request for a parallel discussion from the first communication device 101, sending 207 a request to the subgroup 102 of the communication devices whether each of them wants to join the parallel discussion, and only setting up 208 the parallel discussion group for the communication devices of the subgroup for which a positive response is received. Hereby, the individual devices of the subgroup receive a request from the system 120 to join the parallel discussion, and can say "yes" or "no" to such a request and will only be connected to the parallel discussion group when they have sent a positive response, i.e. said "yes".

According to another embodiment, the method further comprises storing 216 the digital representations of speech of the first communication device 101 and the subgroup 102 of communication devices, and optionally, providing 218 the remaining teleconference communication devices 103, 104 access to the stored digital representations of speech of the first communication device 101 and the subgroup 102 of communication devices. By the system 120 storing the digital representation of speech of the devices of the parallel discussion group, those digital representations of speech can be handled after the teleconference or even during the teleconference. As an example, the stored digital representation of speech of the devices of the parallel discussion group can be made available to the remaining communication devices after the meeting, for example if any of those remaining communication devices are interested in the discussion of the parallel discussion group and/or the devices of the parallel discussion group agrees to or give their consent to providing the stored digital representations to the remaining communication devices.

According to yet another embodiment, the method further comprises conditionally providing 215 the digital representations of speech of the first communication device 101 and the subgroup 102 of communication devices, or information of the digital representations of speech of the first communication device and the subgroup of communication devices to the remaining teleconference communication devices 103, 104 depending on a group privacy information or individual privacy information for the subgroup 102 and the first device 101. Depending on group privacy information or individual privacy information, which may be set by e.g. privacy flags, the digital representations of speech of the devices of the parallel discussion group or of individual of the devices of the parallel discussion group may be provided to the remaining communication devices. Also, the group privacy information or the individual privacy information may be set on a level so that only information of the digital representations of speech of the devices of the parallel discussion group are sent to the remaining communication devices and not the whole digital representations of speech. The information may be e.g., which topic that has been discussed, such as certain key words. The privacy flags may be set by the individual users, especially for individual privacy flags, or by the first device, i.e. the device sending the request for setting up a group, especially for group privacy flags.

According to still another embodiment, the method further comprises determining 209 features for the received digital representations of speech of the communication devices 101, 102 of the parallel discussion group, based on speech analysis of the received digital representations of speech, the features comprising one or more of conversation topics, key words, tone of words. "Tone of words" may be how words are articulated and emphasized in order to determine the importance of certain words, whether the tone of voice is soft, hard, calm, angry, shouting, whispering etc. The determined features may be provided to the remaining teleconference communication devices as part of the information of the digital representations of speech mentioned in step 215.

According to yet another embodiment, the plurality of communication devices 101, 102, 103, 104 connected to the teleconference are handled by a first instance of a Machine Learning Model, MLM, of the system. Further, the setting up 208 of a parallel discussion group for the first communication device 101 and the subgroup 102 of communication devices comprises setting up a second instance of the MLM and hereinafter handling the first communication device 101 and the subgroup of communication devices 102 by the second instance of the MLM and not by the first instance. The second MLM instance can be seen as temporary for the subgroup and the first device only. The first MLM instance may be temporary for the teleconference or setup for and trained over several meetings. By having two separate MLM instances, where the first MLM instance handles the devices of the whole teleconference up to the setting up 208 of the private discussion group, and after the setting up 208 of the private discussion group the devices of the parallel discussion group are handled by the second MLM instance, it becomes easy to treat the digital representations of speech differently and separately, depending on in which discussion group the devices are for the moment. Also, it will be easy to later on merge the devices into one group and one MLM instance again in case the parallel discussion has ended. The plurality of communication devices 101, 102, 103, 104 connected to the teleconference are handled by the first instance of the MLM up to the setting up of the parallel discussion group and the thereby triggered setting up of the second instance of the MLM. After the setting up of the parallel discussion group, the remaining devices 103, 104 in the teleconference are still handled by the first instance of the MLM whereas the first device 101 and the subgroup of devices 102 are handled by the second instance of the MLM.

Figure 3:
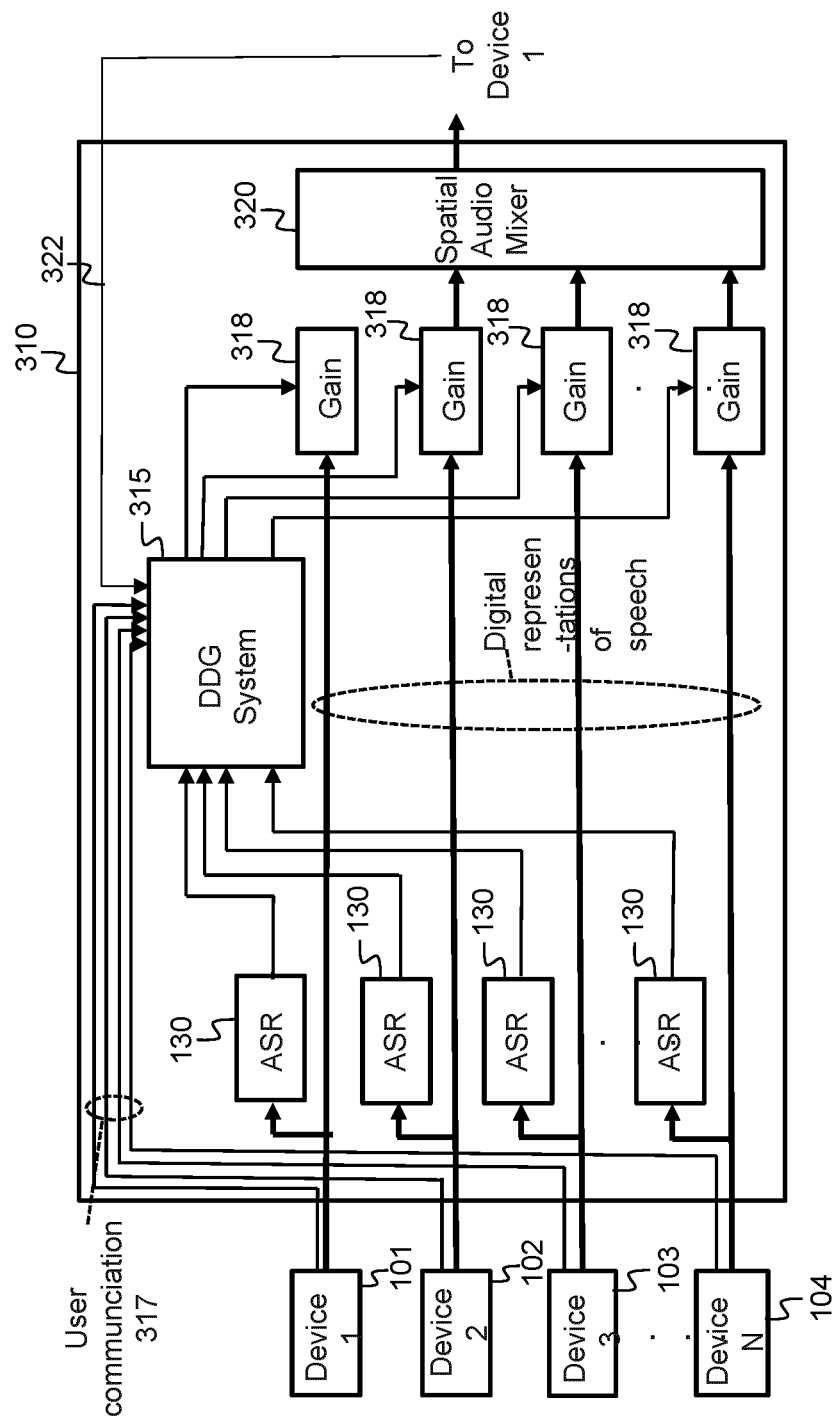
FIG. 3 is a block diagram of a communication system and the inventive system according to possible embodiments.

FIG. 3 shows an overview of an embodiment of a teleconference solution. In this embodiment, a plurality of communication devices 101, 102, 103, 104 are connected to a teleconference via a teleconference system 310. Digital representations of speech detected from sound captured at a microphone of each of a plurality of communication devices are received to the teleconference system 310 from each device as the user/users of each communication device 101, 102, 103, 104 speaks. The teleconference system 310 comprises a Discussion Detection and Grouping (DDG) system 315, which is comparable with the system for handling a teleconference 120 of FIG. 1. The DDG 315 obtains the digital representations of speech from the devices 101, 102, 103, 104.

The DDG system 315 determines gain control values for each digital representation of speech for reproducing each digital representation of speech at individual of the communication devices 101, 102, 103, 104. The individual gain control values are sent to a gain control unit 318 that suppresses or amplifies the individual digital representations of speech according to the individual gain control values. Thereafter, a spatial audio mixer 320 mixes and renders the digital representations of speech before they are sent to the individual communication devices 101, 102, 103, 104.

Further, the DDG system 315 receives, via a user communication connection 317 and during the ongoing teleconference, a request for a parallel discussion from the first communication device 101 connected to the teleconference. In the request, the user of the first communication device 101 indicates that he/she wants to set up a parallel discussion with the second communication device 102, within the ongoing teleconference. The second communication device 102 signifies the subgroup of communication devices of FIG. 1, which may be one or more communication devices. However, in FIG. 3, the subgroup of communication devices is exemplified by only one communication device, called the second communication device. In response, the DDG system 315 sets up a parallel discussion group for the first and the second communication device 101, 102. After the setup of the parallel discussion group, the DDG system 315 provides the digital representations of speech of the first and the second communication device 101, 102 only to the devices of the parallel discussion group, i.e., the first and the second device so that each device of the parallel discussion group is able to play back the digital representations of speech of the other devices of the parallel discussion group. After the setup of the parallel discussion group, the DDG system 315 further provides the digital representations of speech of the remaining communication devices, in this example the third and the fourth communication device 103, 104 to the plurality of communication devices 101, 102, 103, 104, i.e. all communication devices of the original teleconference so that each device of the plurality of communication devices is able to play back the digital representations of speech of the remaining teleconference communication devices.

According to an embodiment, an optional Automatic Speech Recognition (ASR) unit 130 extracts words from each user's digital representation of speech. This is fed into the DDG system 315. There may be one common ASR unit 130 for all digital representations of speech, one ASR unit 130 per digital representation of speech, or one ASR unit 130 per plurality of digital representations of speech. According to an embodiment, the DDG system 315 is further used for determining conversation discussions for the received digital representations of speech/extracted words from the ASR, based on speech analysis. According to this embodiment, the DDG system determines the gain control values based on conversation discussion preferences of a user/users of the individual communication devices and the determined conversation discussions of the digital representations of speech. The DDG may receive conversation discussion preferences and possibly other data relevant for determining gain control values from the individual communication devices over the user communication connection 317. The gain control values, which may be individual for the digital representation of speech may also be individual for each communication device 101, 102, 103, 104 that is to receive the digital representations of speech. This is illustrated by "To device 1" in FIG. 3. In the same way, individually gain controlled digital representations of speech may be sent to Device 2, Device 3, Device 4 102-104 according to each conversation discussion preferences of user/users of each of those communication devices. After receiving the gain-controlled digital representations of speech, the individual devices may act on individual of the received digital representations of speech, e.g. to suppress or decrease individual digital representations according to the user's listening experience. This is illustrated by the arrow 322, which stands for user interaction, in this example from Device 1.

According to another embodiment, a secrecy flag, aka privacy flag may be set that indicates for the DDG system in which way to handle the digital representations of speech of the parallel discussion group. The privacy flag may be set per participant, i.e. communication device or for the whole parallel discussion group. Alternatively, the privacy flag may be set based on discussion topic, key words, hours of day or any digital-physical location of the participants in the teleconference. According to an embodiment, the participants of the original teleconference, i.e. the original open meeting may get indications that there is a parallel discussion ongoing, such as involved participants, topics discussed etc. Which kind of indications that can be sent may depend on the privacy flag. The privacy flag may be set as soon as the first user, i.e. first communication device, requests a private discussion with the second user, i.e. second device. The first and second users may agree on a suitable privacy level and relation to the open teleconference. The privacy flag may be changed any time during the parallel discussion. The privacy flag may be used by the DDG system to determine how to process the digital representations of the parallel discussion.

The privacy flag may be set to different alternatives such as: Not sharing the digital representations of speech of the participants of the private parallel discussion with the participants of the open teleconference; partly sharing the digital representations of speech of the participants of the private parallel discussion with the participants of the open teleconference; fully sharing the digital representations of speech of the participants of the private parallel discussion with the participants of the open teleconference; storing temporarily the digital representations of speech of the participants of the private parallel discussion and removing them as the private discussion or the open teleconference has ended; or storing the digital representations of speech of the participants of the private parallel discussion and after the meeting make them accessible for the private discussion participants and possibly also for the participants of the open teleconference.

According to an embodiment, participation in, and switching between the ongoing teleconference and the temporary parallel discussion, may be initiated by:
 a. A third user, i.e., the third communication device in the example mentioned, provides a request to a participant of the parallel discussion, aka the first device, to participate in the parallel discussion. The third user needs to await an acknowledge or reject to be let into the parallel discussion;
 b. At least one of the participants of the parallel discussion, i.e. the first or the second device in this example, provides a discussion invitation to the third device;
 c. The third user interacts with an XR-rendered graphical object constituting a confined private discussion "blob"-object; i.e. "knocking on the wall to request access" The third user needs to await an acknowledge or reject to be let into the parallel discussion.

According to another embodiment, crosstalk, i.e. audio overhearing from the open teleconference to the parallel discussion may be suppressed or muted according to discussion settings or participating users' preferences.

According to another embodiment, data of the parallel discussion such as the digital representations of speech of the participants of the parallel discussion group may be saved and shared with the open teleconference participants, typically after the meeting, based on e.g., the private discussion participants' full consensus, after a specified ratio of yes/no among participants, or after a timer has expired indicating private discussion subjects are no longer confidential.

According to another embodiment, the parallel discussion participants may decide to make a discussion topic available for inclusion to the open teleconference, e.g., as ASR-generated text. In this case, the DDG system 315 provides the discussion topic/content to the remaining devices 103, 104. Optionally, the DDG system 315 may determine that the information of topic/content of the parallel discussion is obsolete for inclusion if a timer representing the time-since-private-topics-discussed has expired.

According to an embodiment, the DDG system 315 creates a digital representation of the discussions, using a trained ML model, based on received meta data and application data. Said digital representation of the discussion includes information about users, i.e. participants of the teleconference, their locations and the different discussions. The DDG system 315 generates steering/control data, based on the digital representation (visually and/or spatial audio), which will be used to control the audio experience, i.e. the audio suppression and spatial audio, for the participants.

Figure 4:
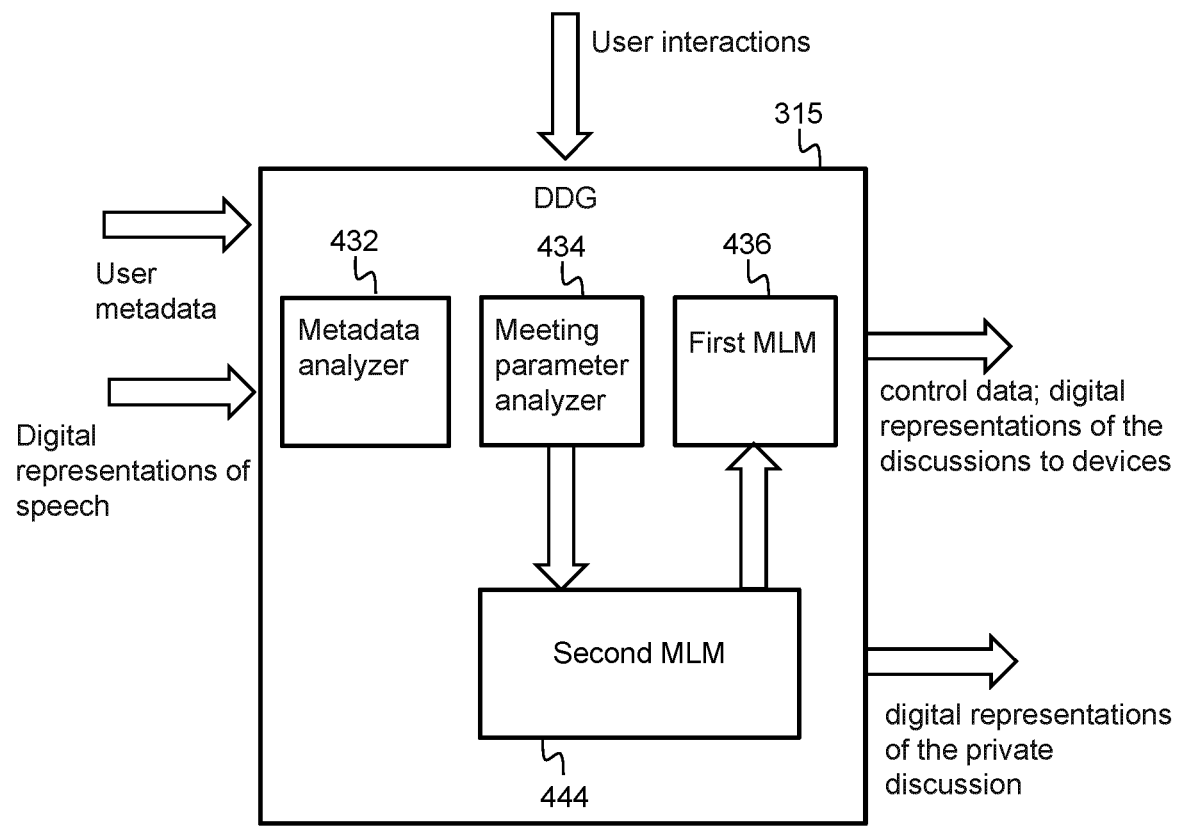
FIG. 4 is a block diagram in more detail of an embodiment of the inventive system.

According to another embodiment, which is shown in FIG. 4, the DDG system 315 may be realized as a machine learning model (MLM), wherein a first MLM instance 436 handles the communication devices of the teleconference, and a second MLM instance 444 handles the communication devices of the private discussion. The second MLM 444 instance may be a separate software instance of the DDG system 315 that is triggered, i.e., set-up when a private discussion is initiated within the teleconference. Here, an Instance of MLM may be regarded as one or more logical or physical entities, residing in at least one physical or logical node in the communication network.

Further, the DDG system 315 may comprise one or more of a metadata analyzing subunit 432 that analyzes received user metadata, and a meeting parameter analyzing subunit 434 that analyzes meeting parameters such as crosstalk level etc. for all devices of the teleconference. The DDG system 315 further comprises the first MLM 436 that handles the digital representations of speech for all devices in the teleconference up to a set-up of a parallel private discussion group. The first MLM 436 determines keywords and peers and keyword representation and control data to control the audio experience for the users of the teleconference. As the private discussion is initiated, a second MLM 444 is initiated within the DDG system 315 and the meeting parameter analyzer 434 sends data necessary for handling the parallel discussion to the second MLM 444, i.e., the digital representation of speech of the devices of the parallel discussion group. The second MLM 444 determines keywords and peers and keyword representation. Further, depending on the privacy flag, the second MLM 444 determines how to handle the digital representations of speech of the communication devices of the private, parallel discussion group. Further, the second MLM 444 outputs to the first MLM 436 data of the parallel discussion that is agreed to be shared with the participants of the teleconference, i.e., according to the privacy flag. The second MLM 444 also outputs to the communication devices of the parallel discussion, the digital representations of speech of the communication devices of the parallel discussion.

Figure 5:
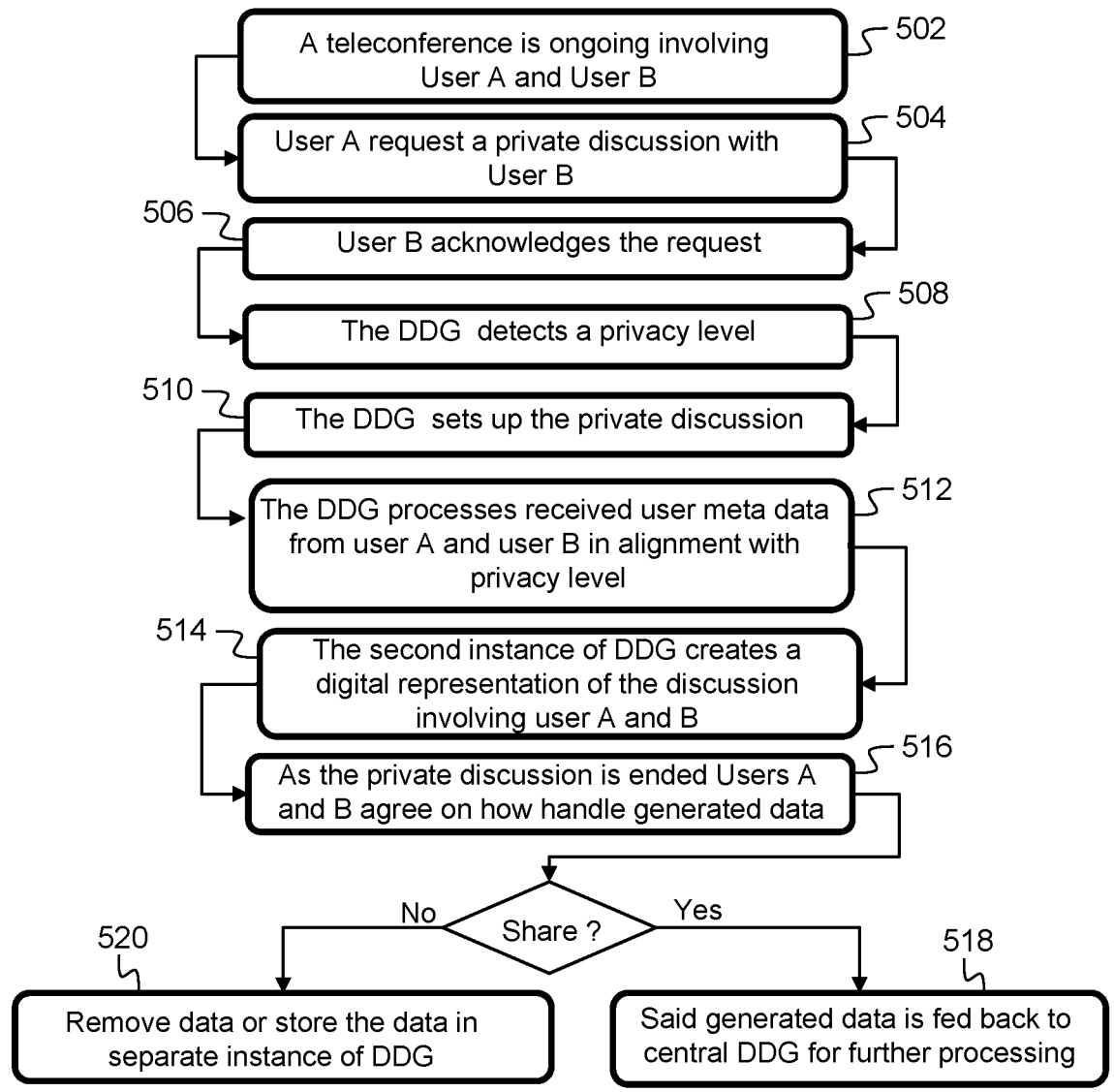
FIG. 5 is a flow chart illustrating a procedure according to possible embodiments.

FIG. 5 shows a flow chart of an embodiment described in the present disclosure. Firstly, there is an ongoing teleconference 502, i.e., online or XR Meeting (XRM) involving multiple participants. Then a first participant of the ongoing teleconference, User A, requests 504 a private discussion with a second participant of the ongoing teleconference, User B. The request may be sent by User A via the DDG to User B or directly by User A to User B. If User B wants to engage in a private discussion with User B and still be connected to the teleconference, User B acknowledges 506 the request. The DDG receives a request from any of User A and User B with information that they want to engage in a private discussion and still be part of the open ongoing teleconference. This request is either implicitly within the request handshake 504, 506 between User A and User B, or as an explicit separate request after User A and User B have agreed. In steps 504, 506 User A and User B also agree to a certain privacy level for their private discussion in relation to the teleconference. The DDG is informed of and detects 508 the certain exchanged and agreed privacy level, as e.g. a Privacy Flag set by at least one of User A or User B. The DDG system sets up 510 a private discussion with user A and User B as participants, as a second MLM instance. The DDG processes 512, from the targeted discussion, upon readout from the second MLM instance trained on in-meeting, user meta data of User A and User B, i.e., user-provided description of meeting attributes, potentially disclosing, depending on privacy level: Present persons (known, unknown); Conversational patterns (who is speaking to who); Given that person is authorized (invited), within conversational patterns, classify spoken topics, and readout content tagging. During the private discussion, the second instance of the DDG system, i.e., the second MLM instance, creates 514 a digital representation of the ongoing discussion involving User A and User B.

As the users A and B engaged in the private discussion end their discussion, they agree 516 (if not already have agreed) on how the created data from the discussion should be handled, i.e. their digital representation of speech and/or topics of their private discussion. If User A and B agreed to share the data or part of the data, the second MLM instance of the DDG system feed 518 the data or part of data back to the central DDG instance, i.e., the first MLM instance, which then includes the data to generate control data that will be used for sharing in the open teleconference. If User A and User B agreed not to share data or parts of data, the generated data or part of data is either stored in the second instance of the MLM for later use by the participants of the private discussion, or the generated data is removed 520.

According to an embodiment, the DDG may provide means to visualize an ongoing private discussion for the participants in the open teleconference meeting to make the participants aware of an ongoing private discussion within the open teleconference. The following may be shown within the open meeting: Presence of a secrecy/privacy flag for the user(s) associated with a secrecy-tagged private discussion; Private discussions that are associated with a secrecy/privacy tag, in that outbound audio, i.e. audio from the private discussion to the teleconference, may be completely suppressed (muted), or private discussions that are associated with a secrecy/privacy tag, in that inbound audio may, i.e. audio from the teleconference to the private discussion, may be suppressed/adjusted depending on setting by users engaged in said private discussion.

A user, i.e., participant, may prefer to follow a person, a topic or a group of people. According to an embodiment, information of such preferences may be used by the DGD system to support the user in selecting which topics, clusters or persons to join when entering digital meeting, such as the open teleconference meeting. However, in the private discussion, data is kept separate from the open meeting. Depending on type of privacy flag, the participants of the private discussion may agree on revealing main topic of their discussion to the open meeting. The privacy flag may be displayed together with main topic for participants of the open meeting. The DDG system may support a person in the open meeting, to join the private discussion, based on e.g. information of preferences.

Figure 6:
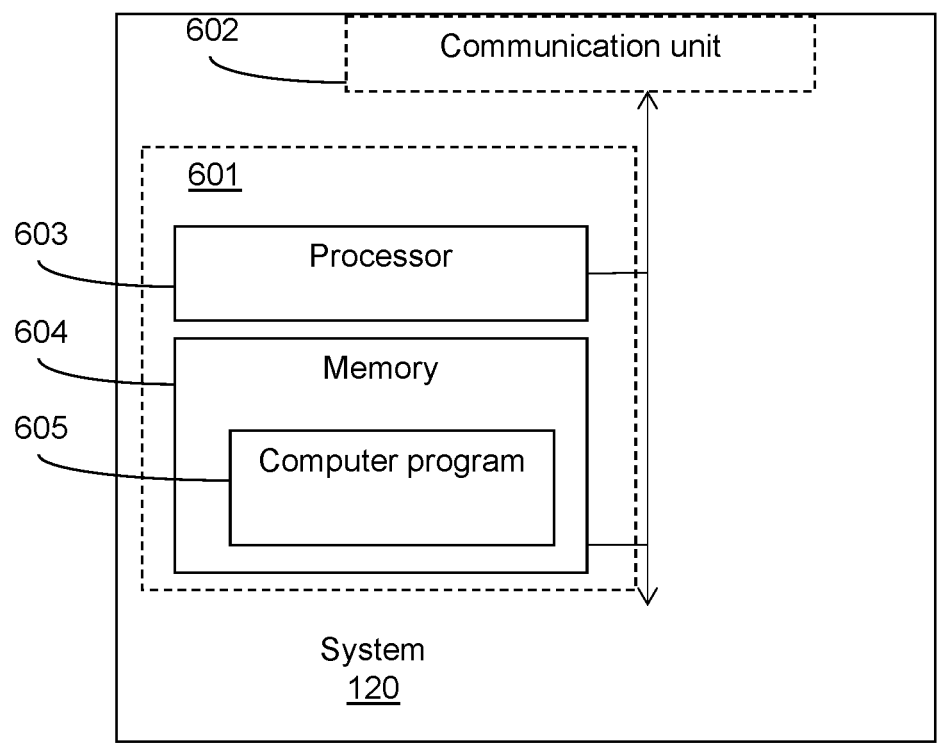
FIG. 6 is a block diagram illustrating a system in more detail, according to further possible embodiments.

FIG. 6, in conjunction with FIG. 1, shows a system 120 operable in a wireless communication system 100 and configured for handling a teleconference. The system 120 comprises a processing circuitry 603 and a memory 604. Said memory contains instructions executable by said processing circuitry, whereby the system 120 is operative for obtaining digital representations of speech detected from sound captured at a microphone of each of a plurality of communication devices 101, 102, 103, 104 connected to the teleconference, and receiving, after the obtaining, a request for a parallel discussion from a first 101 of the plurality of communication devices connected to the teleconference, the request for a parallel discussion being with a subgroup 102 of the plurality of communication devices connected to the teleconference. The system 120 is further operative for, based on the received request, setting up a parallel discussion group for the first communication device 101 and the subgroup 102 of communication devices, which parallel discussion group is at least partly separated from the teleconference, providing the digital representations of speech of the first communication device 101 and the subgroup 102 of communication devices only to the devices 101, 102 of the parallel discussion group so that each device of the parallel discussion group is able to play back the digital representations of speech of the other devices of the parallel discussion group, and providing the digital representations of speech of the plurality of communication devices except the first communication device and the subgroup of communication devices, called remaining teleconference communication devices 103, 104, to the plurality of communication devices 101, 102, 103, 104 so that each device of the plurality of communication devices is able to play back the digital representations of speech of the other devices of the remaining teleconference communication devices.

The system 120 may be a part of the teleconference system 110 of FIG. 1 or a separate system (as shown in the example of FIG. 1). Alternatively, the system 120 may be spread out over different physical or virtual nodes in the communication network 100, a so-called cloud solution.

According to an embodiment, the system 120 is further operable for, before and when receiving the request for a parallel discussion, providing the digital representations of speech of the plurality of communication devices 101, 102, 103, 104 to the plurality of communication devices so that each device of the plurality of communication devices is able to play back the digital representations of speech of the other devices of the plurality of communication devices.

According to an embodiment, the system is further operable for controlling the digital representations of speech of the first communication device 101 and the subgroup 102 of communication devices with a higher gain control value than the digital representations of speech of the remaining teleconference communication devices 103, 104, and the digital representations of speech provided to the first communication device 101 and the subgroup 102 of communication devices are the controlled digital representations of speech.

According to another embodiment, the system is further operable for, in response to the receiving of a request for a parallel discussion from the first communication device 101, sending a request to the subgroup 102 of the communication devices whether each of them wants to join the parallel discussion, and only setting up the parallel discussion group for the communication devices of the subgroup for which a positive response is received.

According to another embodiment, the system is further operable for storing the digital representations of speech of the first communication device 101 and the subgroup 102 of communication devices, and, optionally, providing the remaining teleconference communication devices 103, 104 access to the stored digital representations of speech of the first communication device 101 and the subgroup 102 of communication devices.

According to yet another embodiment, the system is further operable for conditionally providing the digital representations of speech of the first communication device 101 and the subgroup 102 of communication devices, or information of the digital representations of speech of the first communication device and the subgroup of communication devices to the remaining teleconference communication devices 103, 104 depending on a group privacy information or individual privacy information for the subgroup 102 and the first device 101.

According to yet another embodiment, the system is further operable for determining features for the received digital representations of speech of the communication devices 101, 102 of the parallel discussion group, based on speech analysis of the received digital representations of speech, the features comprising one or more of conversation topics, key words, and tone of words.

According to still another embodiment, the system 120 further comprises a first instance 436 and a second instance 444 of a Machine Learning Model, MLM. Further, the system is operative for handling the plurality of communication devices 101, 102, 103, 104 connected to the teleconference by the first instance 436 of the MLM. Also, the system is operative for performing the setting up of the parallel discussion group for the first communication device 101 and the subgroup 102 of communication devices by setting up the second instance 444 of the MLM, and thereafter handling the first communication device 101 and the subgroup of communication devices 102 by the second instance 444 of the MLM and not by the first instance 436.

According to other embodiments, the system 120 may further comprise a communication unit 602, which may be considered to comprise conventional means for wireless or wireline communication with the wireless devices 101, 102, 103, 104, such as a transceiver for wireless transmission and reception of signals in the communication network. The instructions executable by said processing circuitry 603 may be arranged as a computer program 605 stored e.g., in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 120 to perform the steps described in any of the described embodiments of the system 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the system 120 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system of a communication network for handling a teleconference, the method comprising:
   obtaining digital representations of speech detected from sound captured at a microphone of each of a plurality of communication devices connected to the teleconference;
   receiving, after the obtaining, a request for a parallel discussion from a first of the plurality of communication devices connected to the teleconference, the request for a parallel discussion being with a subgroup of the plurality of communication devices connected to the teleconference;
   based on the received request, setting up a parallel discussion group for the first communication device and the subgroup of communication devices, which parallel discussion group is at least partly separated from the teleconference,
   providing the digital representations of speech of the first communication device and the subgroup of communication devices only to the devices of the parallel discussion group so that each device of the parallel discussion group is able to play back the digital representations of speech of the other devices of the parallel discussion group, and
   providing the digital representations of speech of the plurality of communication devices except the first communication device and the subgroup of communication devices, called remaining teleconference communication devices, to the plurality of communication devices so that each device of the plurality of communication devices is able to play back the digital representations of speech of the other devices of the remaining teleconference communication devices.

2. Method according to claim 1, further comprising, before and when receiving the request for a parallel discussion, providing the digital representations of speech of the plurality of communication devices to the plurality of communication devices so that each device of the plurality of communication devices is able to play back the digital representations of speech of the other devices of the plurality of communication devices.

3. Method according to claim 1,
wherein the providing the digital representations of speech of the first communication device and the subgroup of communication devices is provided to the devices of the parallel discussion group with a higher gain control value than the digital representations of speech provided to the remaining teleconference communication devices.

4. Method according to claim 1, further comprising, in response to the receiving of a request for a parallel discussion from the first communication device, sending a request to the subgroup of the communication devices whether each of them wants to join the parallel discussion, and only setting up the parallel discussion group for the communication devices of the subgroup for which a positive response is received.

5. Method according to claim 1, further comprising:
storing the digital representations of speech of the first communication device and the subgroup of communication devices, and
optionally, providing the remaining teleconference communication devices access to the stored digital representations of speech of the first communication device and the subgroup of communication devices.

6. Method according to claim 1, further comprising:
conditionally providing the digital representations of speech of the first communication device and the subgroup of communication devices, or information of the digital representations of speech of the first communication device and the subgroup of communication devices to the remaining teleconference communication devices depending on a group privacy information or individual privacy information for the subgroup and the first communication device.

7. Method according to claim 1, further comprising:
determining features for the received digital representations of speech of the communication devices of the parallel discussion group, based on speech analysis of the received digital representations of speech, the features comprising one or more of conversation topics, key words, and tone of words.

8. Method according to claim 1, wherein the plurality of communication devices connected to the teleconference are handled by a first instance of a Machine Learning Model, MLM, of the system, and wherein the setting up of a parallel discussion group for the first communication device and the subgroup of communication devices comprises setting up a second instance of the MLM and hereinafter handling the first communication device and the subgroup of communication devices by the second instance of the MLM and not by the first instance.

9. A system operable in a wireless communication system and configured for handling a teleconference, the system comprising a processing circuitry and a memory, said memory containing instructions executable by said processing circuitry, whereby the system is operative for:
obtaining digital representations of speech detected from sound captured at a microphone of each of a plurality of communication devices connected to the teleconference;
receiving, after the obtaining, a request for a parallel discussion from a first of the plurality of communication devices connected to the teleconference, the request for a parallel discussion being with a subgroup of the plurality of communication devices connected to the teleconference;
based on the received request, setting up a parallel discussion group for the first communication device and the subgroup of communication devices, which parallel discussion group is at least partly separated from the teleconference,
providing the digital representations of speech of the first communication device and the subgroup of communication devices only to the devices of the parallel discussion group so that each device of the parallel discussion group is able to play back the digital representations of speech of the other devices of the parallel discussion group, and
providing the digital representations of speech of the plurality of communication devices except the first communication device and the subgroup of communication devices, called remaining teleconference communication devices, to the plurality of communication devices so that each device of the plurality of communication devices is able to play back the digital representations of speech of the other devices of the remaining teleconference communication devices.

10. System according to claim 9, further being operable for, before and when receiving the request for a parallel discussion, providing the digital representations of speech of the plurality of communication devices to the plurality of communication devices so that each device of the plurality of communication devices is able to play back the digital representations of speech of the other devices of the plurality of communication devices.

11. System according to claim 9, wherein the providing the digital representations of speech of the first communication device and the subgroup of communication devices is provided to the devices of the parallel discussion group with a higher gain control value than the digital representations of speech provided to the remaining teleconference communication devices.

12. System according to claim 9, further being operable for, in response to the receiving of a request for a parallel discussion from the first communication device, sending a request to the subgroup of the communication devices whether each of them wants to join the parallel discussion, and only setting up the parallel discussion group for the communication devices of the subgroup for which a positive response is received.

13. System according to claim 9, further being operable for:
storing the digital representations of speech of the first communication device and the subgroup of communication devices, and
optionally, providing the remaining teleconference communication devices access to the stored digital representations of speech of the first communication device and the subgroup of communication devices.

14. System according to claim 9, further being operable for:
conditionally providing the digital representations of speech of the first communication device and the subgroup of communication devices, or information of the digital representations of speech of the first communication device and the subgroup of communication devices to the remaining teleconference communication devices depending on a group privacy information or individual privacy information for the subgroup and the first communication device.

15. System according to claim 9, further being operable for:
   determining features for the received digital representations of speech of the communication devices of the parallel discussion group, based on speech analysis of the received digital representations of speech, the features comprising one or more of conversation topics, key words, and tone of words.

16. System according to claim 9, further comprising a first instance and a second instance of a Machine Learning Model, MLM, the system being operative for handling the plurality of communication devices connected to the teleconference by the first instance of the MLM, and wherein the system is operative for performing the setting up of the parallel discussion group for the first communication device and the subgroup of communication devices by setting up the second instance of the MLM, and thereafter handling the first communication device and the subgroup of communication devices by the second instance of the MLM and not by the first instance.

17. A computer program comprising a non-transitory computer readable medium storing instructions, which, when executed by at least one processing circuitry of a system of a wireless communication network, configured for handling a teleconference, causes the system to perform the following steps:
   obtaining digital representations of speech detected from sound captured at a microphone of each of a plurality of communication devices connected to the teleconference;
   receiving, after the obtaining, a request for a parallel discussion from a first of the plurality of communication devices connected to the teleconference, the request for a parallel discussion being with a subgroup of the plurality of communication devices connected to the teleconference;
   based on the received request, setting up a parallel discussion group for the first communication device and the subgroup of communication devices, which parallel discussion group is at least partly separated from the teleconference,
   providing the digital representations of speech of the first communication device and the subgroup of communication devices only to the devices of the parallel discussion group so that each device of the parallel discussion group is able to play back the digital representations of speech of the other devices of the parallel discussion group, and
   providing the digital representations of speech of the plurality of communication devices except the first communication device and the subgroup of communication devices, called remaining teleconference communication devices, to the plurality of communication devices so that each device of the plurality of communication devices is able to play back the digital representations of speech of the other devices of the remaining teleconference communication devices.

* * * * *